United States Patent [19]

Rao et al.

[11] Patent Number: 4,621,593
[45] Date of Patent: Nov. 11, 1986

[54] AUTOMOTIVE DISPENSING APPARATUS FOR FUEL ADDITIVE

[75] Inventors: Vemulapalli D. N. Rao, Bloomfield Township, Oakland County; Wallace R. Wade, Farmington Hills, both of Mich.

[73] Assignee: Ford Motor Company, Dearborn, Mich.

[21] Appl. No.: 685,927

[22] Filed: Dec. 24, 1984

[51] Int. Cl.⁴ .............................................. F02B 75/12
[52] U.S. Cl. ...................................... 123/1 A; 44/57; 60/311
[58] Field of Search ...................... 123/1 A; 44/57, 68, 44/69; 60/274, 311; 222/57, 51

[56] References Cited

U.S. PATENT DOCUMENTS

| | | | |
|---|---|---|---|
| 2,151,432 | 3/1939 | Lyons | 123/1 A |
| 2,737,932 | 3/1956 | Thomas | 103/1 A |
| 2,789,892 | 4/1957 | Pinotti | 44/69 |
| 2,996,364 | 8/1961 | Gay et al. | 44/69 |
| 3,007,781 | 11/1961 | Billmeier | 44/69 |
| 3,124,433 | 3/1964 | Riegert et al. | 44/69 |
| 3,348,932 | 10/1967 | Kukin | 44/57 |
| 4,189,067 | 2/1980 | Nottke et al. | 227/57 |
| 4,253,436 | 3/1981 | Dudrey | 123/198 A |
| 4,276,997 | 7/1981 | Ambler | 222/57 |
| 4,345,429 | 8/1982 | Yasuhara | 123/1 A |
| 4,435,185 | 3/1984 | Kenny et al. | 44/57 |
| 4,462,208 | 7/1984 | Hicks et al. | 60/311 |

Primary Examiner—E. Rollins Cross
Attorney, Agent, or Firm—Joseph W. Malleck

[57] ABSTRACT

A dispensing apparatus is disclosed for adding a fluid agent to the fuel supply of an automotive engine, the agent is effective in depressing the ignition temperature of soot collected in an exhaust trap. The apparatus comprises: (a) a reservoir for containing a supply of the fluid agent such as copper octoate and hexane; (b) an electrically operated pulse pump for positively displacing a measured amount of the agent from the reservoir into the fuel supply; (c) register means for registering the amount of fuel replenished to the engine fuel supply and for transmitting an electrical signal proportional to the amount of fuel so added; and (d) control means responsive to the electrical signal to permit electrical operation of the pulse pump for a number of predetermined pulses to dispense a required amount of the agent for maintaining a desired uniform concentration of the agent throughout the fuel supply.

9 Claims, 3 Drawing Figures

AUTOMOTIVE DISPENSING APPARATUS FOR FUEL ADDITIVE

TECHNICAL FIELD

The invention relates to the art of making liquid agent dispensing systems and, more particularly, to on-board automotive dispensing systems for periodically adding a liquid agent to the fuel supply of the automobile to maintain a desired concentration of such agent.

BACKGROUND OF INVENTION AND STATEMENT OF PRIOR ART

Heretofore, adding liquid catalysts or agents to the fuel supply of an engine, for effecting chemical reactions in the exhaust system, has been substantially a laboratory or prototype experiment. The prior art has recognized that soot, collected from the exhaust gases of a diesel engine, can be more readily removed or eliminated by oxidation if the exhaust gas carries an agent which codeposits with the soot and depresses or catalyzes the ignition temperature of the soot. It is the hope of such technology that during certain driving cycles of the automobile the exhaust temperature will rise to the depressed particulate ignition temperature and cleanse the soot trap, (see copending U.S. application Ser. No. 685,921, filed 12-24-84 assigned to the assignee of this invention, the disclosure of which is incorporated herein).

Most disclosures, in outlining utility for the liquid fuel additives, schematically point to a station at which the additive or agent can be added to the fuel supply without disclosing a dispensing mechanism that would carry out such function (see, for example, U.S. Pat. No. 3,370,419). To be successful, such mechanism must be (a) capable of reliably and automatically maintaining a uniform concentration of the additive in the fuel supply, (b) compensate for excessive residues due to possible interaction between the additive and other impurities in the diesel fuel, and (c) compensate for and prevent possible damage to other automotive components in the event of failure of the dispensing apparatus.

SUMMARY OF INVENTION

The invention is a dispensing apparatus for a fluid agent that is effective in depressing the ignition temperature of carbon, the agent being added to the fuel supply of an automotive engine; the engine has an exhaust system comprising, in part, a particulate carbon trap. The apparatus particularly comprises: (a) a reservoir for containing a supply of the fluid agent; (b) an electrically operated pump means for positively displacing a measured amount of the agent from the reservoir into the fuel supply; (c) register means for registering the amount of fuel replenished to the engine fuel supply and for transmitting an electrical signal proportional to the amount of fuel so added; and (d) control means responsive to the electrical signal to permit electrical operation of the pump means for a period of time to dispense a predetermined amount of the agent for maintaining a desired uniform concentration of the agent throughout the fuel supply.

Preferably, the fluid agent is a mixture of (a) an aerosol-promoting liquid such as hexane, pentane and toluene, and (b) a metal octoate with the metal selected from the group consisting of copper, nickel and cerium, the mixture being maintained in the fuel in a desirable concentration of 0.2–0.5 gm/gal of fuel. Alternatively, the fluid agent may be the combination of copper napthanate and tetraethyl lead (maintained in respective concentration amounts of 0.25 and 0.05 gm/gal of fuel).

The pump means preferably is comprised of a pulse pump effective to deliver about 0.5–1.0 ml of liquid agent per pulse. Advantageously, the pump means utilizes a 12 volt battery power supply and has a thermal resistor to determine the pulse width. Thus, when the current builds up as the pump means is operated, the current exceeds a certain momentary overload and a circuit is broken to determine the pulse width.

Preferably, the register means is comprised of a float effective to sense different levels of the fuel supply, the position of the float affecting a resistance element through which the register means transmits electrical current. Preferably, the control means is comprised of an on-board computer effective to determine the difference in electrical resistance signals resulting from two different float positions, which difference is a measure of the amount of fuel added. Such control means preferably then calculates, in sequence, the number of pulses required by the pump to deliver a volume of liquid agent needed to maintain a desired concentration of the liquid agent in the increased fuel supply. Lastly, the control means energizes the pump to permit only the calculated number of pulses to take place.

Preferably, an assembly may be constructed which compensates for excessive residues due to possible interaction between the additive and other impurities in the diesel fuel; the assembly comprises apparatus as in claim 1 and additionally comprises: (a) a filter for removing residues from the fuel in said fuel supply, and (b) means associated with said filter and operative to continue filtered delivery of said fuel supply even when said filter fails. Preferably, an assembly may be constructed which compensates for and prevents possible damage to other automotive components in the event of failure of the dispensing apparatus. The assembly comprises the apparatus as in claim 1 and additionally comprises: (a) means for sensing the exhaust gas back-pressure adjacent said trap, (b) means for sensing an inoperative condition of said dispensing apparatus, and (c) signal means effective to warn of the simultaneous existence of excessive exhaust gas pressure and an inoperative dispensing apparatus.

DETAILED DESCRIPTION AND BEST MODE

Overall System

Figure 1:
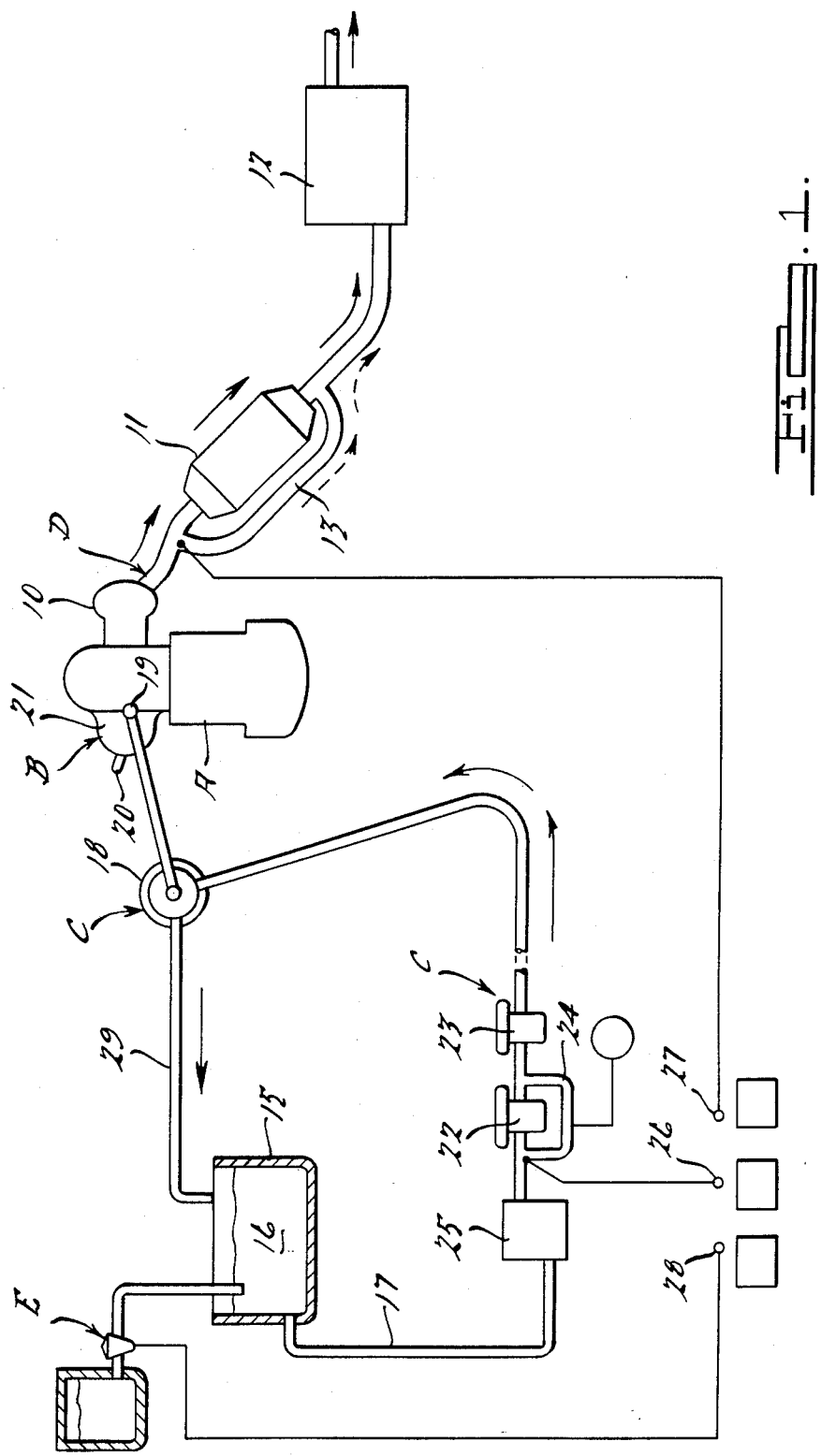
FIG. 1 is a schematic illustration of an overall automotive system in which the dispensing apparatus is used, the system comprising an engine, a fuel supply system, an intake system, an exhaust system, and the additive dispensing system of this invention.

The overall automotive system in which the dispensing apparatus is used is comprised (as shown in FIG. 1) of an engine A, an intake system B for introducing a combustible mixture to the engine (the intake system comprising an air supply 20, a carburetor 19, and an intake manifold 21), a fuel supply system C, an exhaust system D (including an exhaust manifold 10, a particulate trap 11, and a muffler 12), and an additive dispensing system E. The particulate trap 11 has a bypass channel 13 effective to be used when there is an overload or regeneration of the particulate trap.

The engine may be a diesel engine of the type having direct or indirect injection. The fuel supply system C comprises a fuel supply tank 15 from which fuel 16 is normally withdrawn through a conduit 17 leading to an injection pump 18 which in turn is effective in injecting a supply of the fuel into the carburetor 19; a return conduit 29 is used for overflow. A series of fuel filters 22-23 are interposed in the conduit 17 comprising a primary fuel filter 22 and a backup or secondary fuel filter 23; an automatic bypass channel 24 is used to divert fuel around the primary filter when such filter 22 is in a defective condition. A fuel water separator 25 is imposed in the conduit upstream from the fuel filters. A warning light 26 may be operatively connected to the primary fuel filter to indicate a failure of primary filter operation. Similarly, a warning light 27 may be employed to indicate a clogging of the particulate carbon trap, and a warning light 28 may be employed to indicate malfunctioning of the dispensing pump means E.

Dispensing Apparatus

Figure 2:
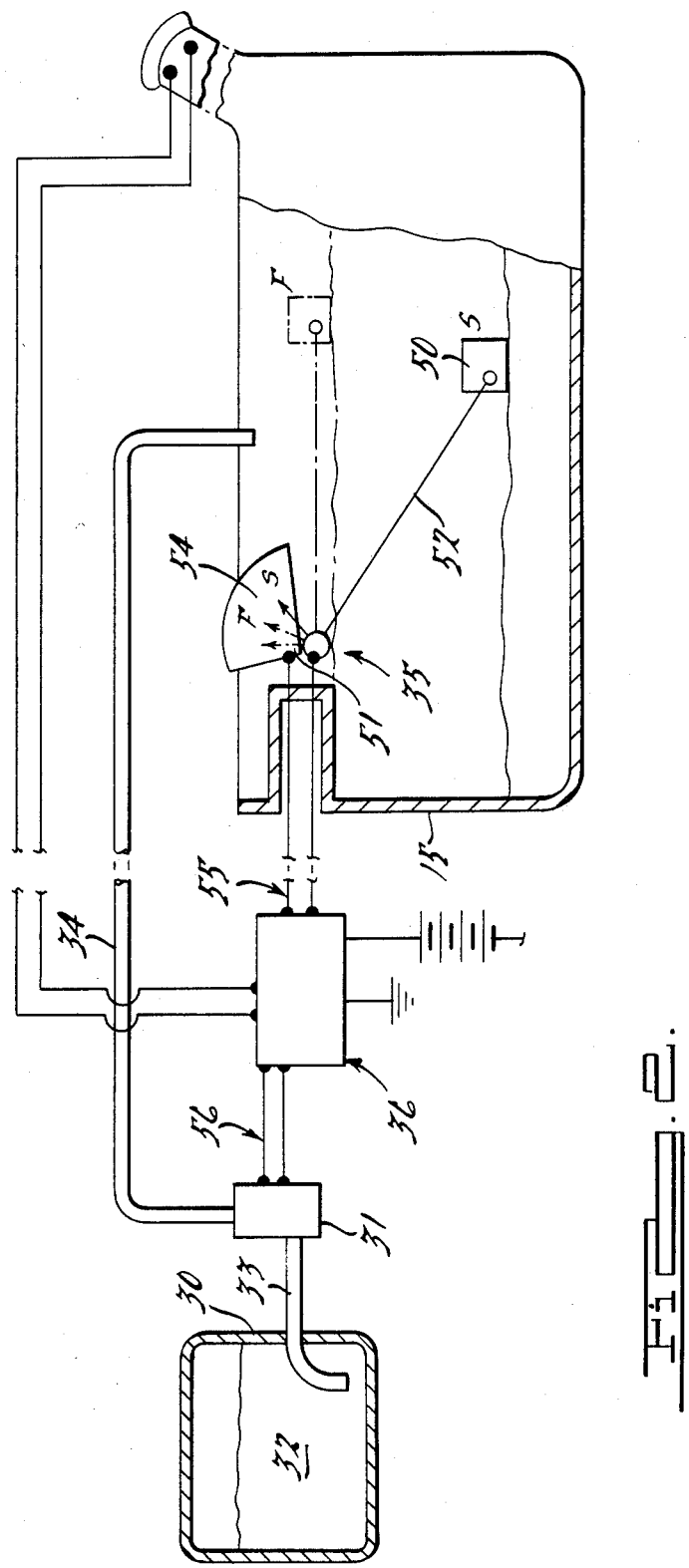
FIG. 2 is an enlarged schematic illustration of the additive dispensing system shown in relationship to the fuel tank.
Figure 3:
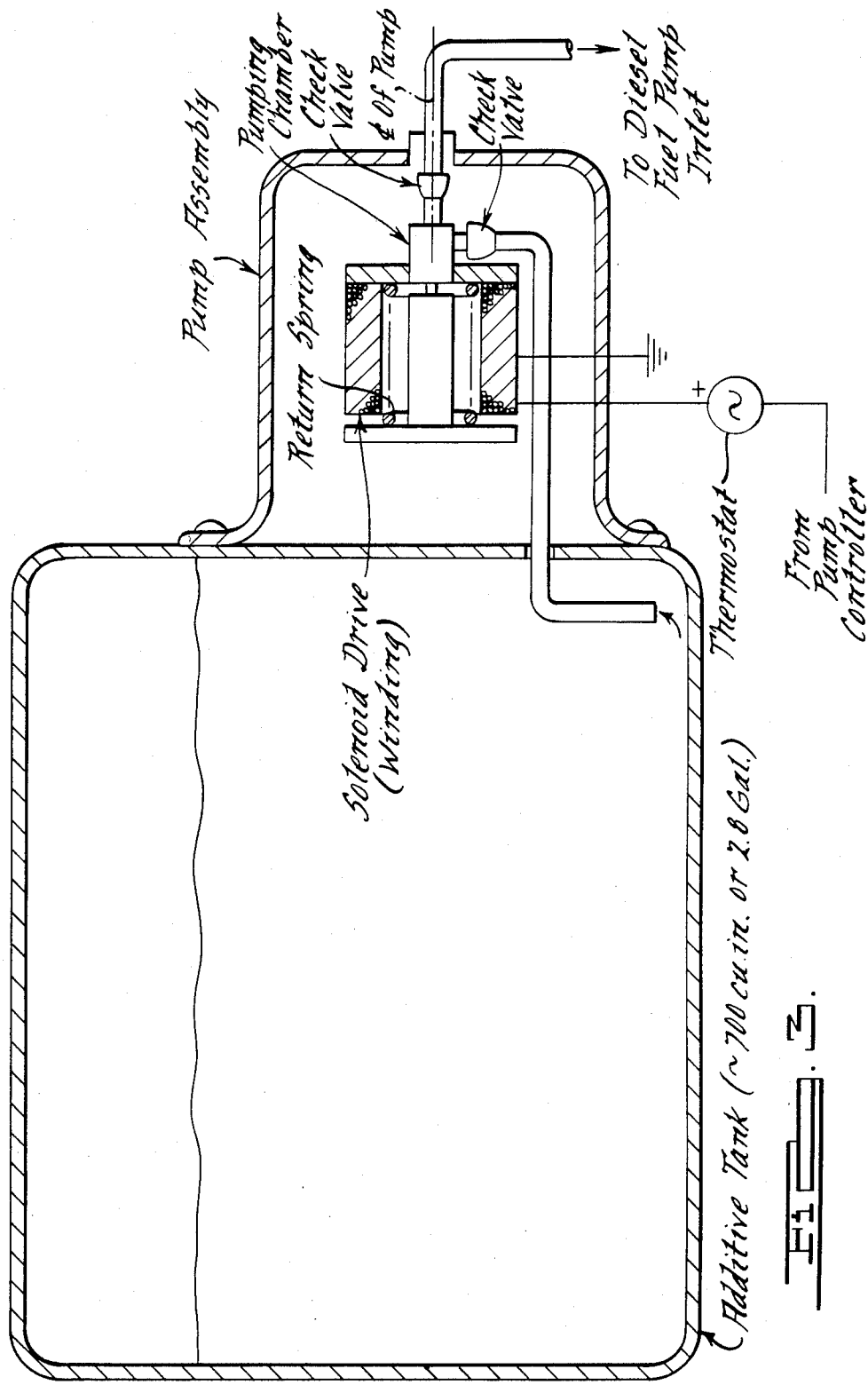
FIG. 3 is an enlarged sectional view of the liquid agent reservoir and the pulse pump used in connection therewith.

Dispensing apparatus E comprises (as shown in FIG. 2) a liquid agent reservoir 30 and electrically operated pump means 31 for positively displacing a measured amount of the liquid agent 32 from the reservoir 30 through conduits 33 and 34 to be dispensed into the fuel supply or gas tank 15. A register means 35 is provided for registering the amount of fuel added to the engine fuel supply and for transmitting an electrical signal proportional to the amount of fuel so added. A control means 36 is provided which is responsive to the electrical signal to permit electrical operation of the pump means for a precise period to dispense a predetermined amount of the liquid agent 32 for maintaining a desired uniform concentration of the liquid agent throughout the fuel supply 16.

The fluid agent contained by the reservoir preferably comprises a liquid mixture of an aerosol-promoting liquid such as hexane, pentane or toluene and an organo metallic salt in the form of a metal octoate or octoate complex, with the metal selected from the group consisting of copper, nickel and cerium. Fluid agents for this invention are more fully set forth in Table I. The organo metallic salts, upon heating, form a readily reducible oxide that combines, reduces or catalyzes the oxidation of carbon in a desired temperature range. The codeposition is carried out by introducing a flow of the exhaust gases from the engine carrying the carbon particles and the metal oxide particles in a finely distributed condition to the trap. The exhaust gases containing the metal oxides and carbon particles are the result of combustion of a finely divided aerosol mist of air, diesel fuel, and an additive effective to promote the formation of an oxide which depresses the ignition of the carbon particles when the metal oxides are codeposited therewith. Such narrow selected range of organo metallic salts combined with the very narrow selection of aerosol forming ingredients promotes a very fine distributed codeposition of carbon and select metal oxides derived from the octoates or octoate complexes. This codeposition can promote an ignition temperature of carbon in the range of 525–675° F. This use of an ignition temperature depressing agent is fully explained in copending U.S. application Ser. No. 685,921 assigned to the assignee of this invention, the disclosure of which is incorporated herein by reference.

Alternatively, other fluid agents may be employed, such as copper napthanate and tetraethyl lead, and is used in a concentration in the fuel supply, respectively, of 0.25 gm/gal of fuel and 0.05 gm/gal of fuel. Although the latter agent mixture is somewhat less stable in the fuel supply, the functioning of such agent is similar to that of the organo metallic octoate salts.

The electrically operated pump means particularly comprises a pulse pump which is effective to deliver in the range of 0.5–1.0 ml of liquid per pulse. The pump means has a voltage supply in the form of a 12 volt battery and has a thermal resistor which determines the pulse width. When the current, as supplied to the pump, exceeds a certain momentary overload, a circuit is broken which determines the pulse width or duration.

The register means 35, in particular, comprises a float 50 which is effective to sense different levels of the fuel supply, the position of the float affecting the resistance of a device 54 through which the register means transmits electrical current. For example, as shown in FIG. 2, when the fuel tank cap is removed, a circuit is completed, joining the pulse pump circuit 56 with the float circuit 55. This triggers the control 36 to place the pump means in an "on" condition. The control 36 senses a first position of the float (labeled S). This sensing is carried out by float arm 52 which, by virtue of its lowered angular position, moves control arm 51 across a variable resistance device 54 to obtain a high resistance for current flowing through the float circuit 55. The device 54 can be essentially a wheatstone bridge. The low electric current (with the high resistance) is transmitted to the control 36 through the float circuit; the control, programmed to know that a desired amount of fluid agent can be pumped for each pulse of the pump, computes the number of pulses required to fill the fuel tank from that lower S position.

Upon completion of addition of fuel and when the fuel tank cap is replaced, the circuit is broken, causing the control to read the adjusted position of the float arm by way of the changed resistance. The float will, for example, as shown in FIG. 2, be in the fully-filled condition (F) of the fuel tank. In this position, the control arm 51 has changed to another position of the wheatstone bridge device, causing the resistance therethrough to be decreased to a maximum amount and increasing current accordingly.

The on-board computer of the control determines the difference in current signals resulting from the two different float positions, which difference is a measure of the amount of fuel added. The computer modifies the number of pulses previously calculated, if the amount added is less than to the "full" position. The control now having calculated the number of pulses required by the pump to deliver a volume of agent needed to maintain a desired concentration of the fluid agent in the increased fuel supply, energizes the pulse pump for a limited number of pulses.

TABLE I

| Metallic Element in the Compound | Fuel Additives | | |
|---|---|---|---|
| | Concentration gm/gal | Form | Carrier |
| Lead | 0.5 | Tetraethyl Lead | Motor Mix |
| Copper | 0.25 | Napthenate | |
| Copper | 0.15–0.5 | Octoate Complex (45 wt % Metal) | Heptane* 5–15 cc/gm of Cu |
| Copper | 0.25 | Octoate Complex (45 wt % Metal) | 5–15 cc/gm of Cu |
| Nickel | 0.25 | Octoate Complex (22.5 wt % Metal) | 5–15 cc/gm of Ni |
| Copper | 0.25 | Octoate Complex (45 wt % Metal) | 5–15 cc/gm of Cu |
| Cerium | 0.20 | Octoate Complex (45 wt % Metal) | 5–15 cc/gm of Ce |

*Part of the heptane can be substituted with mineral spirits of less than 105° C. boiling point - primarily paraffinic.

We claim:

1. An automotive on-board dispensing apparatus for a fluid agent that is effective in depressing the ignition temperature of carbon, said agent being added to the fuel tank of a fuel delivery system for an automotive engine, said fuel tank being replenished by independent separate apparatus normally used to refill tanks after fuel consumption, which engine has an exhaust system comprising a particulate carbon trap, the apparatus comprising:
   (a) a reservoir for containing a supply of said fluid agent is comprised of a liquid mixture of an aerosol promoting liquid and a metal octoate or octoate complex;
   (b) electrically operated pump means for positively displacing a measured amount of said agent from said reservoir into said fuel supply;
   (c) register means in said tank for registering the amount of fuel replenished to said engine fuel tank after each refill and for transmitting an electrical signal proportional to the amount of fuel so added; and
   (d) control means responsive to said electrical signal to permit electrical operation of said pump means for a period of time to dispense a predetermined amount of said agent directly to said replenished fuel supply for maintaining a desired uniform concentration of said agent throughout said fuel supply.

2. An automotive onboard dispensing apparatus for a fluid agent that is effective in depressing the ignition temperature of carbon, said agent being added to the fuel tank of a fuel delivery system for an automotive engine, said fuel tank being replenished by independent separate apparatus normally used to refill fuel tanks after fuel consumption, which engine has an exhaust system comprising a particulate carbon trap, the apparatus comprising:
   (a) a reservoir containing a supply of said fluid agent, said fluid agent being comprised of a liquid mixture of an aerosol promoting-liquid selected from the group consisting of hexane, pentane and toluene, and a metal octoate or octoate complex with the metal selected from the group consisting of copper, nickel and cerium, the desired concentration being 0.2–0.5 gm/gal of fuel;
   (b) electrically operated pump means for positively displacing a measured amount of said agent from said reservoir into said fuel supply;
   (c) register means in said tank for registering the amount of fuel replenished to said engine fuel tank after each refill and for transmitting an electrical signal proportional to the amount of fuel so added; and
   (d) control means responsive to said electrical signal to permit electrical operation of said pump means for a period of time to dispense a predetermined amount of said agent directly to said replenished fuel supply for maintaining a desired uniform concentration of said agent throughout said fuel supply.

3. The apparatus as in claim 1, in which said fluid agent is comprised of a liquid mixture of copper napthanate and tetraethyl lead, the desired concentration being, respectively, about 0.25 and 0.05 gm/gal of fuel.

4. The apparatus as in claim 1, in which said electrically operated pump means is comprised of an onboard voltage supply and a pulse pump connected to said voltage supply, said pump being effective to deliver 0.5–1.0 ml of liquid per pulse.

5. The apparatus as in claim 4, in which the voltage supply for said pulse pump is a 12 volt battery and said pulse pump has a thermal resistor effective to determine the pulse width whereby, when the current through said pump means exceeds a certain momentary overload, a circuit is broken to determine the pulse completion.

6. The apparatus as in claim 2, in which said register means is comprised of a float effective to sense different levels of said fuel supply, the position of said float affecting the resistance of an element through which the register means transmits electric current.

7. The apparatus as in claim 6, in which said control means is comprised of an on-board computer effective to sense the difference in resistance signals resulting from two different float positions, which difference is a measure of the amount of fuel added, said computer being effective to then, in sequence, calculate the number of pulses required by said pump to deliver a predetermined volume of liquid agent needed to maintain a desired concentration of the liquid agent in the increased fuel supply, and said computer then being effective in sequence to control energization of the pump to permit only the calcuated number of pulses.

8. An assembly comprising the apparatus as in claim 1, and additionally comprises:
   (a) a filter for removing residues from the fuel in said fuel supply; and
   (b) means associated with said filter and operative to continue filtered delivery of said fuel supply even when said filter fails.

9. An assembly comprising the apparatus as in claim 2, and additionally comprising:
  (a) means for sensing the exhaust gas back-pressure adjacent said trap; and
  (b) means for sensing an inoperative condition of said dispensing apparatus; and
  (c) signal means effective to warn of the simultaneous existence of excessive exhaust gas pressure and an inoperative dispensing apparatus.

* * * * *